US 9,178,651 B2

(12) United States Patent
Srinivasa et al.

(10) Patent No.: US 9,178,651 B2
(45) Date of Patent: Nov. 3, 2015

(54) STREAM PARSING IN A COMMUNICATION SYSTEM

(75) Inventors: Sudhir Srinivasa, Sunnyvale, CA (US); Hongyuan Zhang, Fremont, CA (US)

(73) Assignee: Marvell World Trade Ltd., St. Michael (BB)

( * ) Notice: Subject to any disclaimer, the term of this patent is extended or adjusted under 35 U.S.C. 154(b) by 635 days.

(21) Appl. No.: 13/231,670

(22) Filed: Sep. 13, 2011

(65) Prior Publication Data

US 2012/0076219 A1 Mar. 29, 2012

Related U.S. Application Data

(60) Provisional application No. 61/387,915, filed on Sep. 29, 2010, provisional application No. 61/387,919, filed on Sep. 29, 2010.

(51) Int. Cl.
*H04L 1/00* (2006.01)
*H04L 1/06* (2006.01)

(52) U.S. Cl.
CPC ............ *H04L 1/0033* (2013.01); *H04L 1/0041* (2013.01); *H04L 1/06* (2013.01)

(58) Field of Classification Search
CPC ... H04L 1/0033; H04L 1/0041; H04L 1/0059; H04L 1/009; H04L 25/03866; H04L 25/03872; H04L 1/06
USPC .................. 375/240, 241, 260, 261, 265, 298; 332/103; 714/755–757, 787, 790
See application file for complete search history.

(56) References Cited

U.S. PATENT DOCUMENTS

| 7,599,332 | B2 | 10/2009 | Zelst et al. |
| 7,742,390 | B2 | 6/2010 | Mujtaba |
| 8,619,907 | B2 | 12/2013 | Mujtaba et al. |
| 2005/0254476 | A1 | 11/2005 | Sudo |
| 2006/0105724 | A1 | 5/2006 | Nakao |

(Continued)

FOREIGN PATENT DOCUMENTS

| JP | 2004-336561 A | 11/2004 |
| JP | 2006-237658 A | 9/2006 |

(Continued)

OTHER PUBLICATIONS

IEEE Std 802.11 b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.

(Continued)

*Primary Examiner* — Young T Tse

(57) ABSTRACT

In a method for parsing data in a data unit into a number of spatial streams, a modulation and coding scheme (MCS) is selected from a plurality of MCSs. Information bits are encoded using one or more encoders to generate coded bits, wherein the number of encoders used depends on the selected MCS. The coded bits into a number of spatial streams according to a first set of parsing rules if the coded bits satisfy a parsing constraint. The coded bits are parsed into the number of spatial streams according to a second set of parsing rules if the coded bits do not satisfy the parsing constraint.

10 Claims, 10 Drawing Sheets

(56) References Cited

U.S. PATENT DOCUMENTS

| | | | |
|---|---|---|---|
| 2007/0291671 A1* | 12/2007 | Yoshii | 370/310 |
| 2009/0196163 A1 | 8/2009 | Du | |
| 2009/0310701 A1* | 12/2009 | Shim et al. | 375/267 |
| 2010/0046358 A1 | 2/2010 | van Nee | |
| 2010/0091675 A1 | 4/2010 | Sawai | |
| 2010/0309834 A1 | 12/2010 | Fischer et al. | |
| 2011/0002219 A1 | 1/2011 | Kim et al. | |
| 2011/0026623 A1 | 2/2011 | Srinivasa et al. | |
| 2011/0075753 A1* | 3/2011 | Jung et al. | 375/267 |

FOREIGN PATENT DOCUMENTS

| | | |
|---|---|---|
| WO | WO-2009-059229 A1 | 5/2009 |
| WO | WO2011/014685 A2 * | 2/2011 |

OTHER PUBLICATIONS

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band, " *The Institute of Electrical and Electronics Engineers, Inc.*, Apr. 2003.

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

S. A. Mujtaba, "IEEE P802.11—Wireless LANs, TGn Sync Proposal Technical Specification," *The Institute of Electrical and Electronics Engineers, Inc.*, doc.: IEEE 802.11—04/0889r6, May 2005.

"IEEE P802.11n™/D3.00, Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.

"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.

Srinivasa et al., "MCS Selection and Padding Equations," IEEE 802.11-10/0820r0, Jul. 13, 2010, pp. 1-13.

Srinivasa et al., "11ac 80MHZ Transmission Flow," IEEE 802/11-10/05548r2, May 17, 2010, pp. 1-23.

Zhang et al., "160MHz Stream parser," IEEE 802.11-10/1264r1, Nov. 8, 2010, pp. 1-7.

International Search Report in corresponding PCT/US11/51416 mailed Dec. 6, 2011.

Written Opinion in corresponding PCT/US11/51416 mailed Dec. 6, 2011.

International Preliminary Report on Patentability for International Application No. PCT/US2011/051416 mailed Apr. 2, 2013—8 pages.

Stacey et al., "IEEE P802.11, Wireless LANs, Proposed TGac Draft Amendment," Institute of Electrical and Electronics Engineers, doc. No. IEEE 802.11-10/1361r3 (Jan. 2011).

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).

IEEE Std 802.11a-1999 (R2003) (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999) Reaffirmed Jun. 12, 2003.

IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 GHZ Band," *The Institute of Electrical and Electronics Engineers, Inc.*, 1999.

IEEE Std 802.11g/D2.8, May 2002 (Supplement to ANSI/IEEE Std 802.11, 1999 Edition) "Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band," *The Institute of Electrical and Electronics Engineers, Inc.*, May 2002.

IEEE Std P802.11-REVma/06.0, "Unapproved Draft Standard for Information Technology—Telecommunications and information exchange between systems—Local and metropolitan area network—Specific requirements Part 11: Wireless LAN Medium Access Control (MAC) and Physical Layer (PHY) specifications. (This document reflects the combining of the 2003 Edition of 802.11 plus the 802.11 g, 802.11 h, 802.11 i and 802.11j Amendments) (Revision of IEEE Std 802.11-1999) (Superseded by P802.11-REVma_D7.0)," 2006.

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).

Chen, "Home Network Basis: Transmission Environments and Wired/Wireless Protocols," Prentice Hall (Jul. 2003).

Hiertz, et al., "The IEEE 802.11 Universe," IEEE Communications Magazine, pp. 62-70, Jan. 2010.

van Nee, et al. "The 802.11n MIMO-OFDM Standard for Wireless LAN and Beyond," Wireless Personal Communications, vol. 37, pp. 445-453 (Jun. 2006).

Stacey et al., "Specification Framework for TGac," document No. IEEE 802.11-09/0992r20, *Institute for Electrical and Electronics Engineers*, pp. 1-49, Jan. 18, 2011.

Perahia et al., "Gigabit Wireless LANs: an overview of IEEE 802.11ac and 80211ad," ACM SIGMOBILE Mobile Computing and Communications Review, vo. 15, No. 3, pp. 23-33, Jul. 2011.

IEEE Std P802.11 ad/D5.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 3: Enhancements for Very High Throughput in the 60 GHz Band," *The Institute of Electrical and Electronics Engineers, Inc.*, Sep. 2011.

Harada, "Project: IEEE P802.15 Working Group for Wireless Personal Area Network (WPANs)," IEEE 802.15-07-0693-003c (May 2007).

(56) References Cited

OTHER PUBLICATIONS

Yu, et al. "Coverage extension for IEEE802.11ah," *The Institute of Electrical and Electronics Engineers*, doc. No. IEEE 802.11-11/0035r1, (Jan. 2011).

Taghavi et al., "Introductory Submission for TGah", doc. No. IEEE 802.11-11/0062r0, *Institute for Electrical and Electronics Engineers*, pp. 1-5 (Jan. 14, 2011).

de Vegt, "Potential Compromise for 802.11ah Use Case Document", Institute of Electrical and Electronics Engineers, doc. No. IEEE 802.11-11/0457r0, (Mar. 2011).

Vermani, et al. "Spec Framework Text for PHY Numerology," *The Institute of Electrical and Electronics Engineers*, doc. No. IEEE 802.11-11/1311r0, (Sep. 2011).

Office Action for corresponding European Application No. 11 761 447.9, dated Feb. 27, 2014.

First Office Action in Chinese Application No. 201180044740.X, dated Apr. 1, 2015, with English translation (13 pages).

Reasons for Rejection in Japanese Application No. 2013-531621, dated Jun. 2, 2015, with English translation (4 pages).

Communication pursuant to Article 94(3) EPC in European Application No. 11 761 447.9-1860, dated Jul. 23, 2015 (5 pages).

\* cited by examiner

FIG. 4

| MCS | Modulation | Coding Rate |
|---|---|---|
| 0 | BPSK | 1/2 |
| 1 | QPSK | 1/2 |
| 2 | QPSK | 3/4 |
| 3 | 16-QAM | 1/2 |
| 4 | 16-QAM | 3/4 |
| 5 | 64-QAM | 2/3 |
| 6 | 64-QAM | 3/4 |
| 7 | 64-QAM | 5/6 |
| 8 | 256-QAM | 3/4 |
| 9 | 256-QAM | 7/8 |

*FIG. 5*

| MODULATION | CODING RATE | NUMBER OF SPATIAL STREAMS |
|---|---|---|
| 64 QAM | 2/3 | 5 |
| 64 QAM | 2/3 | 7 |
| 64 QAM | 3/4 | 5 |
| 64 QAM | 3/4 | 7 |

STREAM PARSING IN A COMMUNICATION SYSTEM

CROSS-REFERENCES TO RELATED APPLICATIONS

This disclosure claims the benefit of U.S. Provisional Patent Application No. 61/387,915, filed on Sep. 29, 2010, and U.S. Provisional Patent Application No. 61/387,919, filed on Sep. 29, 2010, the disclosures of both of which are hereby incorporated by reference herein in their entireties.

FIELD OF THE DISCLOSURE

The present disclosure relates generally to communication networks and, more particularly, to spatial stream parsing in a wireless communication system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Development of wireless local area network (WLAN) standards, such as the Institute for Electrical and Electronics Engineers (IEEE) 802.11a, 802.11b, 802.11g, and 802.11n Standards, has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps. Work has begun on a new standard, IEEE 802.11 ac, that promises to provide even greater throughput.

SUMMARY

In one embodiment, a method for parsing data in a data unit into a number of spatial streams includes selecting a modulation and coding scheme (MCS) from a plurality of MCSs and encoding information bits to generate coded bits using one or more encoders, wherein the number of encoders used depends on the selected MCS. The method also includes parsing the coded bits into a number of spatial streams according to a first set of parsing rules if the coded bits satisfy a parsing constraint, and parsing the coded bits into the number of spatial streams according to a second set of parsing rules if the coded bits do not satisfy the parsing constraint.

In another embodiment, an apparatus for generating data units for transmission in a wireless network includes a network interface configured to select a modulation and coding scheme (MCS) from a plurality of MCSs. The network interface includes one or more encoders configured to encode information bits to generate coded bits, wherein the number of encoders used for encoding the data unit depends on the selected MCS. The network interface also includes a spatial stream parser configured to (i) parse the coded bits into a number of spatial streams according to a first set of parsing rules if the coded bits satisfy a parsing constraint and (ii) parse the coded bits into the number of spatial streams according to a second set of parsing rules if the coded bits do not satisfy the parsing constraint.

In yet another embodiment, a method for decoding a data unit, wherein the data unit includes a number of spatial streams, the method includes determining a system configuration used for transmitting the data unit, wherein the system configuration is described by at least (i) a modulation and coding scheme (MCS), (ii) a channel bandwidth, and (iii) the number of spatial streams. The method also includes determining a number of decoders needed for the determined system configuration. The method further includes parsing coded data bits from the number of spatial streams to the determined number of decoders according to a first set of parsing rules if the coded bits satisfy a parsing constraint, and parsing coded data bits from the number of spatial streams to the determined number of decoders according to a second set of parsing rules if the coded bits do not satisfy the parsing constraint. The method still further includes decoding the parsed coded data bits to generate information bits using the determined number of decoders.

In still another embodiment, an apparatus for decoding a received data unit includes a network interface configured to determine a system configuration used for transmitting the received data unit, wherein the system configuration is described by at least (i) a modulation and coding scheme (MCS), (ii) a channel bandwidth, and (iii) the a number of spatial streams, and determine a number of decoders needed for the determined system configuration. The network interface includes a spatial stream parser configured to parse coded data bits from the number of spatial streams to the determined number of decoders according to a first set of parsing rules if the coded bits satisfy a parsing constraint, and parse coded data bits from the number of spatial streams to the determined number of decoders according to a second set of parsing rules if the coded bits do not satisfy the parsing constraint. The network interface also includes one or more decoders configured to decode the parsed coded data bits to generate information bits.

BRIEF DESCRIPTION OF THE DRAWINGS

FIG. 4 is an example modulation and coding scheme (MCS) table, according to an embodiment.

FIG. 5 is a table providing some example configurations that do not satisfy a parsing constraint, according to an embodiment.

DETAILED DESCRIPTION

In embodiments described below, a wireless network device such as an access point (AP) of a wireless local area network (WLAN) transmits data streams to one or more client stations. According to an embodiment, the AP utilizes spatial multiplexing for transmission to at least one of the client stations by transmitting data streams to this client station via a plurality of spatial streams. To this end, in an embodiment, coded information bits are parsed at the AP into multiple spatial streams prior to transmission according to predefined parsing rules that allow the client station to unambiguously decode the data. In some embodiments, if a certain system configuration does not satisfy a certain constraint associated with the parsing rules, this system configuration is then not utilized for transmission (i.e., this particular system configuration is excluded from a set of allowed system configurations). In an embodiment, a system configuration is described by at least a particular modulation and coding scheme (MCS)/channel bandwidth/number of spatial streams combination. However, in some embodiments, it is beneficial to use some system configurations at which the constraint is not satisfied, for example in order to utilize desirable data rates associated with these system configurations. Accordingly, in one such embodiment, in order to accommodate at least some system configurations at which the parsing constraint is not satisfied, a different set of parsing rules is utilized, one that allows the data to be unambiguously decoded at the client station even in situations in which the parsing constraint is not satisfied.

Figure 1:
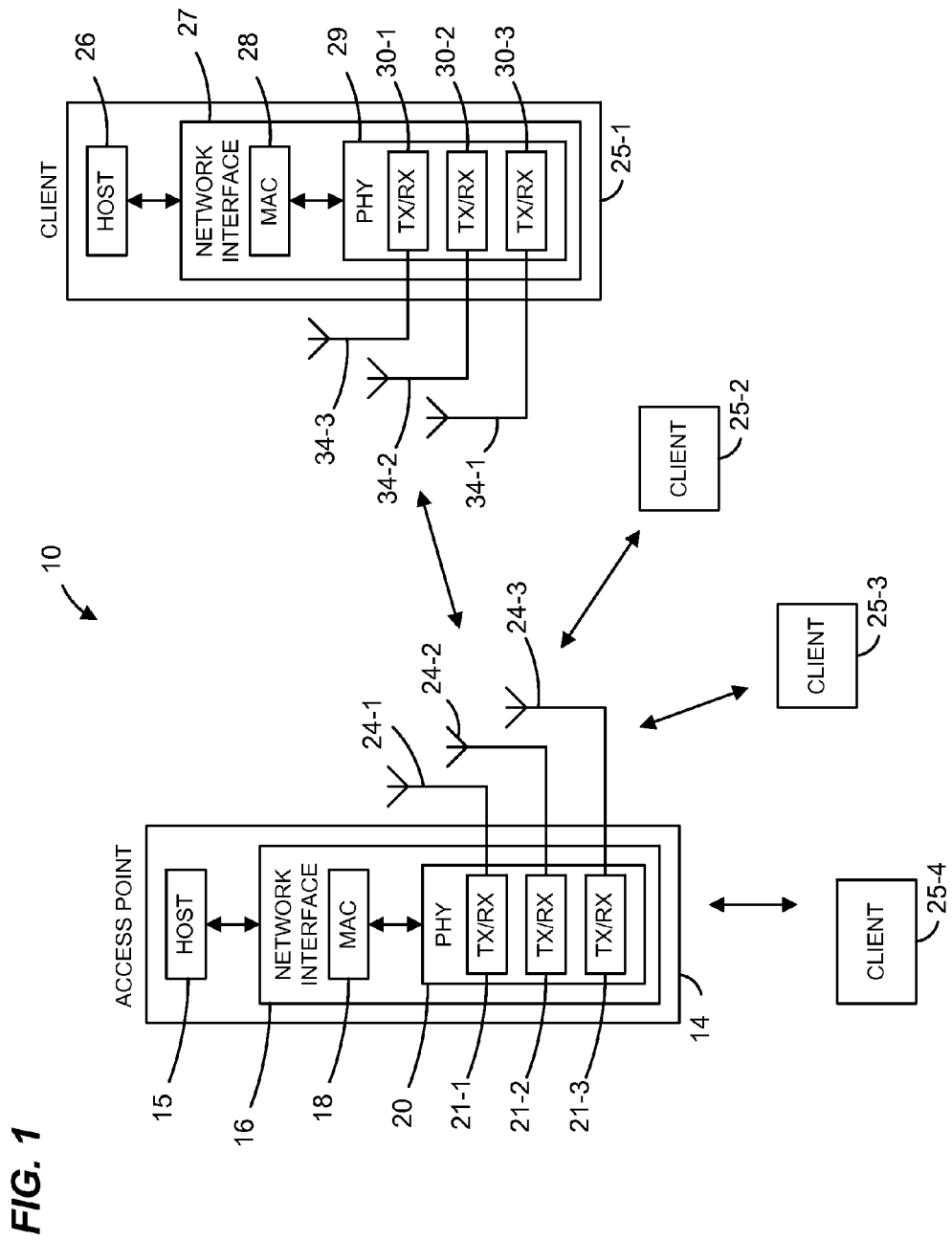
FIG. 1 is a block diagram of an example wireless communication network in which parsing techniques described herein are utilized, according to an embodiment.

FIG. 1 is a block diagram of an example wireless local area network (WLAN) 10, according to an embodiment. An AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments. In one embodiment, the MAC processing unit 18 and the PHY processing unit 20 are configured to operate according to a first communication protocol. The first communication protocol is also referred to herein as a very high throughput (VHT) protocol. In another embodiment, the MAC unit processing 18 and the PHY processing unit 20 are also configured to operate according to at least a second communication protocol (e.g., the IEEE 802.11n Standard, the IEEE 802.11g Standard, the IEEE 802.11a Standard, etc.).

The WLAN 10 includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. At least one of the client stations 25 (e.g., client station 25-1) is configured to operate at least according to the first communication protocol.

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In an embodiment, one or all of the client stations 25-2, 25-3 and 25-4 has a structure the same as or similar to the client station 25-1. In these embodiments, the client stations 25 structured the same as or similar to the client station 25-1 have the same or a different number of transceivers and antennas. For example, the client station 25-2 has only two transceivers and two antennas, according to an embodiment.

In various embodiments, the PHY processing unit 20 of the AP 14 is configured to generate data units conforming to the first communication protocol. The transceiver(s) 21 is/are configured to transmit the generated data units via the antenna(s) 24. Similarly, the transceiver(s) 24 is/are configured to receive the data units via the antenna(s) 24. The PHY processing unit 20 of the AP 14 is configured to process received data units conforming to the first communication protocol, according to an embodiment.

In various embodiments, the PHY processing unit 29 of the client device 25-1 is configured to generate data units conforming to the first communication protocol. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is configured to process received data units conforming to the first communication protocol, according to an embodiment.

Figure 2:
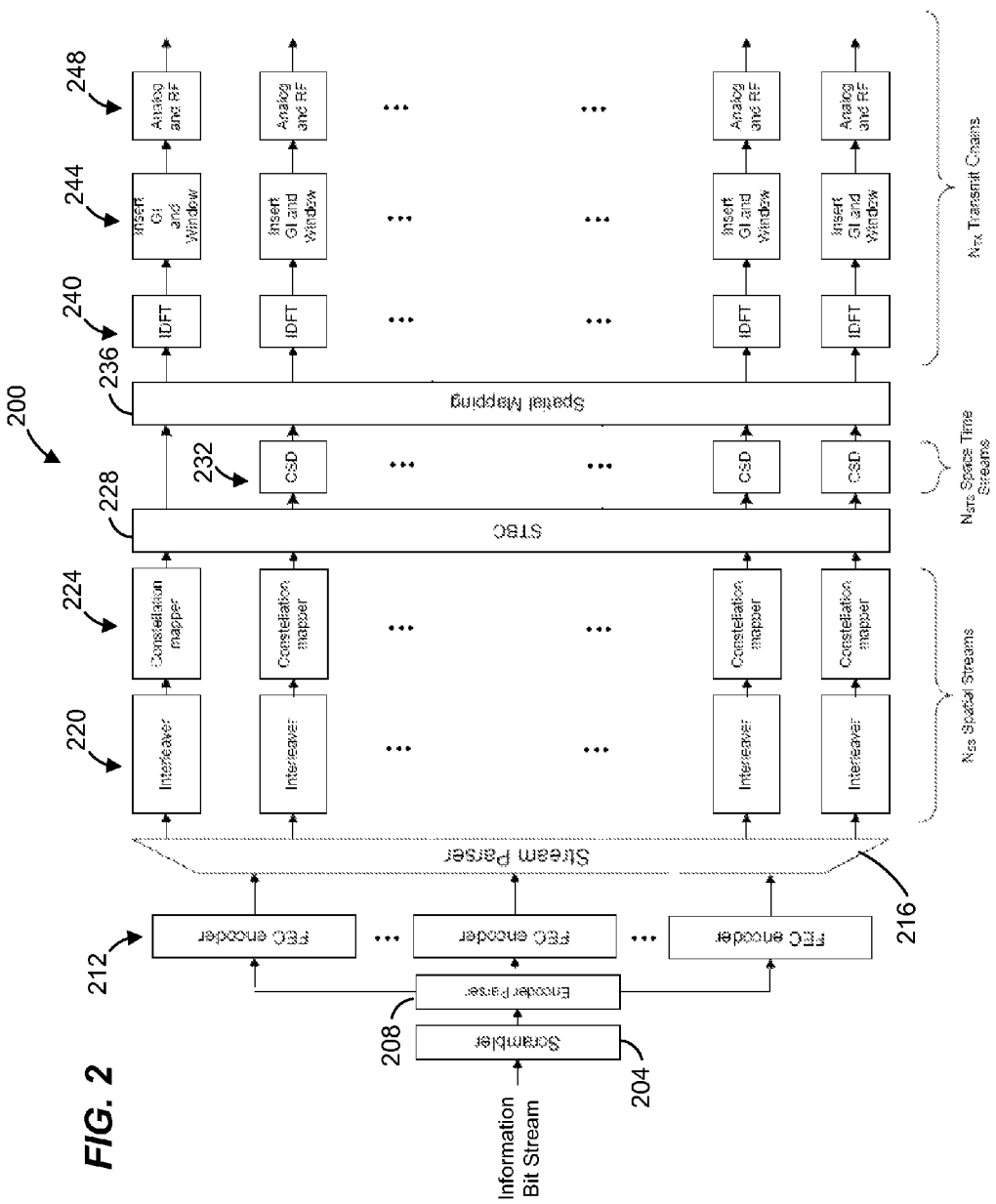
FIG. 2 is a block diagram of an example physical layer (PHY) processing unit, according to an embodiment.

FIG. 2 is a block diagram of an example PHY processing unit 200 configured to operate according to the VHT protocol, according to an embodiment. Referring to FIG. 1, the AP 14 and the client station 25-1, in one embodiment, each include a PHY processing unit such as the PHY processing unit 200.

The PHY unit 200 includes a scrambler 204 that generally scrambles an information bit stream to reduce the occurrence of long sequences of ones or zeros, according to an embodiment. In another embodiment, the scrambler 204 is replaced with a plurality of parallel scramblers (not shown) located after an encoder parser 208. In this embodiment, each of the parallel scramblers has a respective output coupled to a respective one of a plurality of forward error correction (FEC) encoders 212. The plurality of parallel scramblers operate simultaneously on a demultiplexed stream. In yet another embodiment, the scrambler 204 comprises a plurality of parallel scramblers and a demultiplexer that demultiplexes the information bit stream to the plurality of parallel scramblers, which operate simultaneously on demultiplexed streams. These embodiments may be useful, in some scenarios, to accommodate wider bandwidths and thus higher operating clock frequencies.

The encoder parser 208 is coupled to the scrambler 204. The encoder parser 208 demultiplexes the information bit stream into one or more encoder input streams corresponding to one or more FEC encoders 212. In another embodiment with a plurality of parallel scramblers, the encoder parser 208 demultiplexes the information bit stream into a plurality of streams corresponding to the plurality of parallel scramblers.

Different numbers of encoders 212 operate in parallel in various embodiments and/or scenarios. For example, according to one embodiment, the PHY processing unit 200 includes four encoders 212, and one, two, three, or four encoders operate simultaneously depending on the particular MCS, bandwidth, and the number of spatial streams. In another embodiment, the PHY processing unit 200 includes five encoders 212, and one, two, three, four, or five encoders operate simultaneously. In another embodiment, the PHY unit 200 includes up to ten encoders 212, and one, two, three, four, five, six, seven, eight, nine or ten encoders operate simultaneously depending on the particular MCS, bandwidth, and guard interval being utilized. In an embodiment, the number of encoders operating simultaneously increments at multiples of the data rate, e.g., every 600 Mbps. In other words, one encoder is utilized for data rates up to 600 Mbps, two encoders are utilized for data rates between 600 Mbps and 1200 Mbps, as an example.

Each encoder 212 encodes the corresponding input stream to generate a corresponding encoded stream. In one embodiment, each FEC encoder 212 includes a binary convolutional encoder. In another embodiment, each FEC 212 encoder includes a binary convolutional encoder followed by a puncturing block. In another embodiment, each FEC encoder 212 includes a low density parity check (LDPC) encoder. In yet another embodiment, each FEC encoder 212 additionally includes a binary convolutional encoder followed by a puncturing block. In one embodiment, each FEC encoder 212 is configured to implement any of: 1) binary convolutional encoding without puncturing; 2) binary convolutional encoding with puncturing; or 3) LDPC encoding.

A stream parser 216 parses the one or more encoded streams into one or more spatial streams for separate interleaving and mapping into constellation points. Corresponding to each spatial stream, an interleaver 220 interleaves bits of the spatial stream (i.e., changes the order of the bits) to prevent long sequences of adjacent noisy bits from entering a decoder at the receiver. Also corresponding to each spatial stream, a constellation mapper 224 maps an interleaved sequence of bits to constellation points corresponding to different subcarriers of an orthogonal frequency division multiplexing (OFDM) symbol. More specifically, for each spatial stream, the corresponding constellation mapper 224 translates every bit sequence of length $\log_2(C)$ into one of C constellation points. In various embodiments and/or scenarios, the constellation mappers 224 handl different numbers of constellation points depending on the MCS being utilized. In one embodiment, each constellation mapper 224 is a quadrature amplitude modulation (QAM) mapper that handles C=2, 4, 16, 64, 256, and 1024. In other embodiments, the constellation mappers 224 handle different modulation schemes corresponding to C equaling different subsets of at least two values from the set {2, 4, 16, 64, 256, 1024}.

In an embodiment, a space-time block coding (STBC) unit 228 receives the constellation points corresponding to the one or more spatial streams and spreads the spatial streams to a greater number of space-time streams. In some embodiments, the space-time block coding unit 228 is omitted. A plurality of cyclic shift diversity (CSD) units 232 are coupled to the space-time block unit 228. The CSD units 232 insert cyclic shifts into all but one of the space-time streams (if more than one space-time stream) to prevent unintentional beamforming. For ease of explanation, the inputs to the CSD units 232 are referred to as space-time streams even in embodiments in which the space-time block coding unit 228 is omitted.

A spatial mapping unit 236 maps the space-time streams to transmit chains. In various embodiments, spatial mapping includes one or more of: 1) direct mapping, in which constellation points from each space-time stream are mapped directly onto transmit chains (i.e., one-to-one mapping); 2) spatial expansion, in which vectors of constellation point from all space-time streams are expanded via matrix multiplication to produce inputs to the transmit chains; and 3) beamforming, in which each vector of constellation points from all the space-time streams is multiplied by a matrix of steering vectors to produce inputs to the transmit chains.

Each output of the spatial mapping unit 236 corresponds to a transmit chain, and each output of the spatial mapping unit 236 is operated on by an inverse discrete Fourier transform (IDFT) unit 240 that converts a block of constellation points to a time-domain signal. Outputs of the IDFT units 240 are provided to GI insertion and windowing units 244 that prepend, to each OFDM symbol, a guard interval (GI) portion, which is a circular extension of the OFDM symbol in an embodiment, and smooth the edges of each symbol to increase spectral decay. Outputs of the GI insertion and windowing units 244 are provided to analog and RF units 248 that convert the signals to analog signals and upconvert the signals to RF frequencies for transmission. The signals are transmitted in a 20 MHz, a 40 MHz, an 80 MHz, a 120 MHz, or a 160 MHz bandwidth channel, in various embodiments and/or scenarios.

Figure 3:
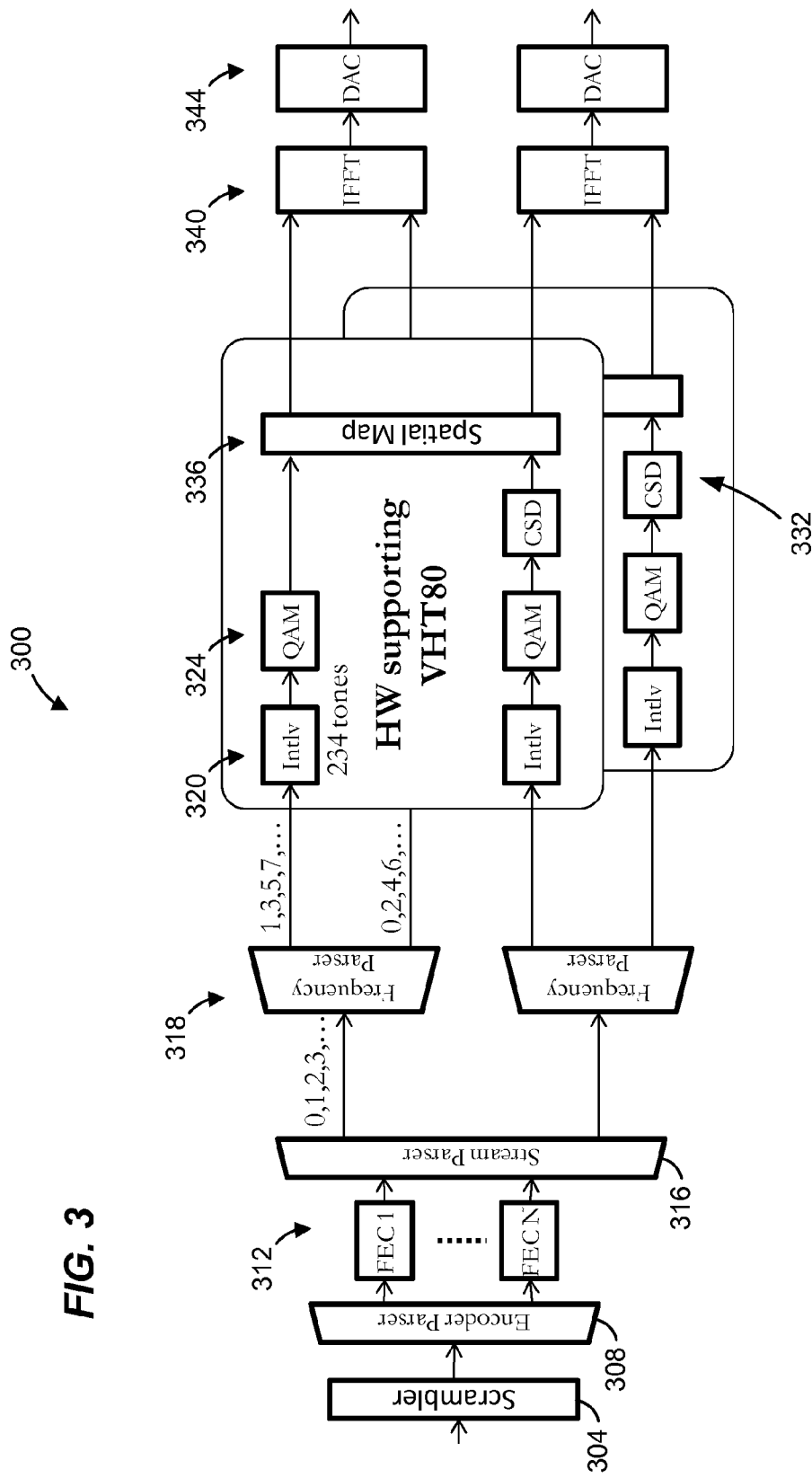
FIG. 3 is a block diagram of another example physical layer (PHY) processing unit, according to another embodiment

In an embodiment, a particular channel is a composite channel that is processed at least partially in two or more individual channels. In other words, in this embodiment, the composite channel comprises two or more individual channels, and the individual channels are processed individually. For example, in an embodiment, an 80 MHz channel is processed at least partially using two 40 MHz portions. As another example, a 160 MHz channel is processed at least partially using two 80 MHz portions, according to another embodiment. FIG. 3 is a block diagram of an example PHY processing unit 300 configured to generate data units for a 160 MHz composite channel using two 80 MHz channels, according to an example embodiment. The PHY processing unit 300 is similar to the PHY processing unit 200 of FIG. 2, except that the PHY processing unit 300 includes a frequency parser 318 coupled to each of the outputs of the stream parser 316. In an embodiment, the frequency parser 318 distributes the coded bits for each spatial stream equally between the two 80 MHz channels. In the PHY processing unit 300, the scrambler 304, the encoder parser 308, the encoders 312, and the stream parser 316 all operate in the entire 160 MHz band, while separate interleaving units 320, separate constellation mapping units 324, separate CSD units 332 and separate spatial mapping units 336 are used to process each of the 80 MHz band portions. In an embodiment, a 160 MHz channel is transmitted using a dual radio transceiver architecture having two separate front end blocks. For example, a first radio transceiver transmits the lower 80 MHz portion of the channel, and a second radio transceiver transmits the upper 80 MHz portion of the channel, according to one such embodiment. Accordingly, in this embodiment, a separate IDFT unit 340 and a separate DAC unit 344 is used for each of the 80 MHz subbands. In another embodiment, the entire 160 MHz channel is transmitted using a single radio transceiver architecture (or a single RF front end). Accordingly, in this embodiment, a single IDFT unit 340 and a single DAC unit 344 are used to generate the entire 160 MHz for each spatial stream.

In an embodiment, a particular modulation and coding scheme (MCS) utilized by the PHY processing unit 200 (FIG. 2), or the PHY processing unit 300 (FIG. 3), is selected from a suitable set of MCSs (e.g., from an MCS table). An example MCS table, according to one embodiment, is provided in the table of FIG. 4. The selected MCS, in combination with other specifics of the system configuration, such as, for example, the channel bandwidth being utilized, the number of tones in an OFDM symbol used for transmitting data ("data tones"), the number of spatial streams, etc., generally determines the data rate of transmission, according to an embodiment. Various example transmission channels and tone mappings that are utilized in some embodiments of the present disclosure are described in U.S. patent application Ser. No. 12/846,681, entitled "Methods and Apparatus for WLAN Transmission", filed on Jul. 29, 2010, which is hereby incorporated by reference herein in its entirety. In an embodiment, the data rate, in turn, determines the number of FEC encoders that are needed to operate in parallel ("operating encoders") to generate the data unit.

Once information bits are encoded by the appropriate number of encoders, in an embodiment, the coded data bits are parsed into one or more spatial streams according to certain parsing rules. Various parsing rules are described herein in reference to FIG. 2, however, these parsing rules are also utilized by a dual channel PHY processing unit, such as, for example, the PHY processing unit 300, according to some embodiments. In some such embodiments, parsing rules are specified based on the channel bandwidth corresponding to each of the individual channels, and these parsing rules are utilized by a stream parser that operates over the entire bandwidth range. In some such embodiments, parsing rules are the same as the parsing rules specified in the IEEE 802.11n Standard. However, in some situations, certain constraints associated with the parsing rules ("parsing constraints") that are satisfied in the case of a subchannel bandwidth are not satisfied in the case of the entire channel bandwidth, according to an embodiment. In these situations, in some embodiments, use of the parsing rules that are based on the subchannel bandwidth for the entire channel results in improper parsing of data from spatial streams on the receive side (e.g., at the client station 25-1 of FIG. 1), and therefore, in these situations, the data cannot be properly recovered at the receiver.

Referring now to FIG. 2, according to an embodiment, the encoder parser 208 assigns bits to the operating encoders 212 in accordance with certain encoder parsing rules. For example, in an embodiment, according to one encoder parser rule, the encoder parser 208 assigns bits to the operating encoders 212 in a round robin fashion, assigning one bit to each operating encoder 212 in one cycle. Further, in an embodiment, according to another encoder parsing rule, each of the operating encoders 212 operates on an equal number of information bits, and, accordingly, the encoder parser 208 assigns an equal number of information bits to each of the operating encoders 212.

Similarly, after the information bits are encoded by the encoders 212, the stream parser 216 allocates the coded bits to a number of spatial streams in accordance with spatial stream parsing rules, according to an embodiment. In one embodiment, for example, the stream parser 216 uses the output of each encoder 212 in a round robin fashion, assigning S bits from one encoder 212 to a number of spatial streams in one cycle, where:

$$S = \sum_{i_{SS}=1}^{N_{SS}} \max\left\{1, \frac{N_{BPSCS}(i_{SS})}{2}\right\}$$ Equation 1 and where $N_{SS}$ is the number of spatial streams and $N_{BPSCS}(i_{SS})$ is the number of coded bits per carrier for spatial stream $i_{SS}$. In an embodiment, according to this parsing rule, the stream parser 216 assigns $N_{SS} \times s$ bits from each operating encoder 212, in a round robin fashion, to the $N_{SS}$ spatial streams, assigning S consecutive block of s bits from one encoder to each of the $N_{SS}$ spatial streams in a cycle, according to an embodiment. Further, in an embodiment, according to a second spatial stream parsing rule, an equal number of coded bits from each of the operating encoders 212 is assigned to each of the $N_{SS}$ spatial streams. That is, in accordance with this parsing rule, each operating encoder 212 contributes an equal number of bits to each spatial stream.

In some embodiments, in order to satisfy various parsing rules, padding is utilized to ensure that the encoder parser 212 and/or the spatial stream parser 216 operates on a suitable number of bits. Padding generally involves adding bits or symbols of a known value or values (e.g., zero or some other suitable value or set of values) to a set of information bits or symbols. In one embodiment, for instance, padding is utilized to ensure that the number of information bits in an OFDM symbol at the input to the encoder parser 208 is an integer multiple of the number of operating encoders as determined by the particular system configuration being utilized. In this case, padding ensures that an equal number of information bits will be input to each encoder 212 after parsing by the parser 208. As another example, padding is utilized to lengthen a set of information data prior to encoding and/or a set of coded data bits after encoding to ensure that each of the spatial streams receives an equal number of coded bits from each operating encoder, according to an embodiment. Some padding schemes according to various embodiments and/or scenarios can be found, for example, in U.S. patent application Ser. No. 12/846,681, entitled "Methods and Apparatus for WLAN Transmission".

In some situations, however, a large number of padding bits or padding symbols is needed to satisfy certain parsing rules. Accordingly, in some such embodiments or situations, system configurations corresponding to certain MCS/channel bandwidth/number of spatial streams combinations are not utilized for transmission. That is, in these embodiments, certain MCSs are disallowed for use with particular channel bandwidths and particular numbers of spatial streams, or, alternatively, certain MCSs are completely excluded from the set of allowed MCSs (e.g., from an MCS table). For instance, in one such embodiment, an MCS is not allowed for a particular channel bandwidth if the constraint represented by Equation 2 is not satisfied for the system configuration:

$$\mod\left(\frac{N_{CBPS}}{N_{ES}}, D_R\right) = 0,$$ Equation 2

$$R = \frac{N_R}{D_R} \text{ where } D_R = \begin{cases} 2, R = \frac{1}{2} \\ 3, R = \frac{2}{3} \\ 4, R = \frac{3}{4} \\ 6, R = \frac{5}{6} \end{cases}$$

where $N_{CBPS}$ is the number of coded bits per OFDM symbol, $N_{ES}$ is the number of encoders required to encode the data stream, and $N_R$ and $D_R$ are the numerator and the denominator, respectively, of the coding rate R as indicated in Equation 2. Equation 2 generally ensures that an MCS is utilized for transmission only if the number of data bits (i.e., information bits before encoding) per OFDM symbol and the number of coded bits per OFDM symbol corresponding to the system configuration are both integer multiples of the number of encoders being utilized (i.e., $N_{DBPS}/N_{ES}$ and $N_{CBPS}/N_{ES}$ are both integers), according to an embodiment.

Additionally, in one embodiment, to achieve equal parsing from each operating encoder 212 to the $N_{SS}$ spatial streams, a further constraint that the number of coded bits at the output of each operating encoder is an integer multiple of $N_{SS} \times s$, in addition to the constrain represented by Equation 2, needs to be satisfied. In an embodiment, this constraint is represented by Equation 3:

$$\mathrm{mod}(N_{CBPS}, N_{ES} N_{SS} s) = 0 \quad \text{Equation 3}$$

In some embodiments, the constraint of Equation 3 is satisfied for all allowed MCSs for all channel bandwidth/number of spatial streams combinations (e.g., for all system configurations for which Equation 2 is satisfied), and in these embodiments, therefore, no further MCS exclusions or stream parser rule alterations due to the constraint represented by Equation 3 not being satisfied need to be made. On the other hand, in another embodiment, this constraint is satisfied for a particular allowed MCS in certain cases, for example for some of the channel bandwidths, and is not satisfied for the same MCS in some other cases, such as for other channel bandwidths. For instance, in one such embodiment, this constraint is satisfied for all allowed MCSs in accordance with Equation 2 for an 80 MHz channel, but it is not satisfied for at least some of the allowed MCSs in accordance with Equation 2 for a 160 MHz channel. As one specific example, four MCS/spatial stream combinations listed in the table of FIG. 5 do not satisfy the constraint of Equation 3 in the case of 160 MHz channel, according to one embodiment. As a result, in such cases, coded bits from each encoder cannot be equally distributed between the spatial streams for a 160 MHz channel, even if the condition represented by Equations 2 is satisfied.

Figure 6:
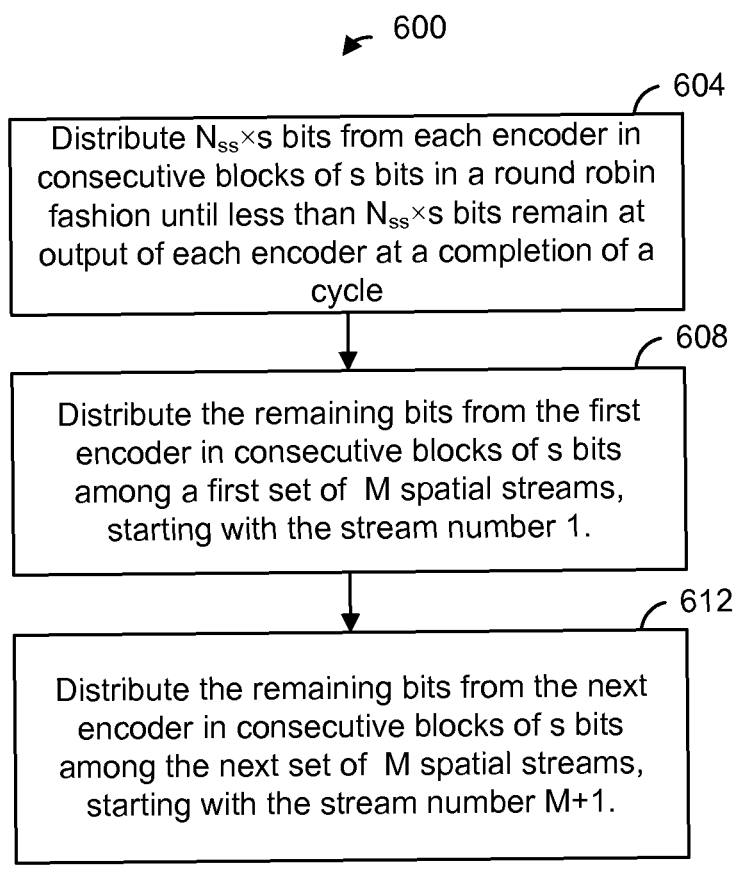
FIG. 6 is a diagram illustrating a parsing technique using a set of parsing rules which accommodate uneven distribution of bits from encoders to spatial streams, according to an embodiment.

In order to allow use of the system configurations that do not satisfy a parsing constraint (e.g., Equation 3), in some embodiments, parsing rules used for at least some system configurations, such as, for instance, for the MCS/spatial stream combinations listed in FIG. 5, are altered to allow uneven distribution from the operating encoders 212 to the $N_{SS}$ spatial streams. For example, FIG. 6 is a flow diagram of a stream parsing technique 600 using a set of parsing rules which accommodates uneven distribution from the encoders 212 to the $N_{SS}$ spatial streams, according to one embodiment.

At block 604, $N_{SS} \times s$ bits from each operating encoder are assigned in consecutive blocks of s bits to the spatial streams in a round robin fashion, as discussed above with reference to Equation 1, until the last block of M×s bits remains at the output of each operating encoder, wherein M is an integer and M<$N_{SS}$. Mathematically, in an embodiment, M is represented by:

$$M = \mathrm{mod}(N_{CBPS}/(N_{SS} s), N_{ES}) \quad \text{Equation 4}$$

At block 608, the residue M×s bits from the first encoder are assigned in consecutive blocks of s bits to a first set of M spatial streams, starting with the stream number 1. At block 612, the residue M×s bits from the second encoder 212 are assigned to a second set of M spatial streams starting with the stream number M+1. This process (i.e., block 612) continues until all of the residue bits from all of the operating encoders 212 are assigned in this manner to the spatial streams. In an embodiment, if the last stream has been reached before all of the coded bits from all of the encoders have been distributed, the process then continues starting again with the spatial stream number 1.

In an illustrative example implementing the technique 600, a 160 MHz channel (with 468 data tones) is used with 5 spatial streams ($N_{SS}$=5), and MCS number 5 (i.e. 64 QAM, 2/3 coding rate) is selected from the MCS table of FIG. 4. In this case, the constellation size is equal to 6 (i.e., constellation size=$\log_2$(number of points in constellation)=$\log_2(64)$=6), and therefore, according to Equation 1, S is equal to 3*5=15 (i.e., s=3), according to an embodiment. The number of coded bits in an OFDM symbol is determined by $N_{CBPS}$=number of data tones*constellation size*number of spatial streams=468*6*5=14040. In an embodiment, the data rate is determined by ($N_{CBPS}$*coding rate)/symbol duration. For example, if symbol duration is 3.6 μs, the data rate is then 2.6 GHz. Accordingly, if the number of encoders increment for each additional 600 Mbps in the data rate, the number of operating encoders in this case is equal to 5 ($N_{ES}$=5). Therefore, the number of s-bit blocks in an OFDM symbol at the output of each of the operating encoders, in this case, is equal to 936. Referring to FIG. 6, at block 604, in this embodiment, 15-bit blocks from each encoder are distributed in round robin fashion to the 5 spatial streams, with 3 bits assigned to each spatial stream in each cycle until one 3-bit block remains at the output of each of the operating encoders (i.e., M=1). At block 608, the remaining 3 bit block at the output of the first encoder is assigned to the first spatial stream. At block 612, the remaining 3 bit block at the output of the second operating encoder is assigned to the second spatial stream, then the remaining 3 bit block at the output of the third operating encoder to the third spatial stream, and so on, until all of the remaining bits at the outputs of all of the operating encoders have been assigned in this manner to the $N_{SS}$ (in this case 5) spatial streams.

Figure 7:
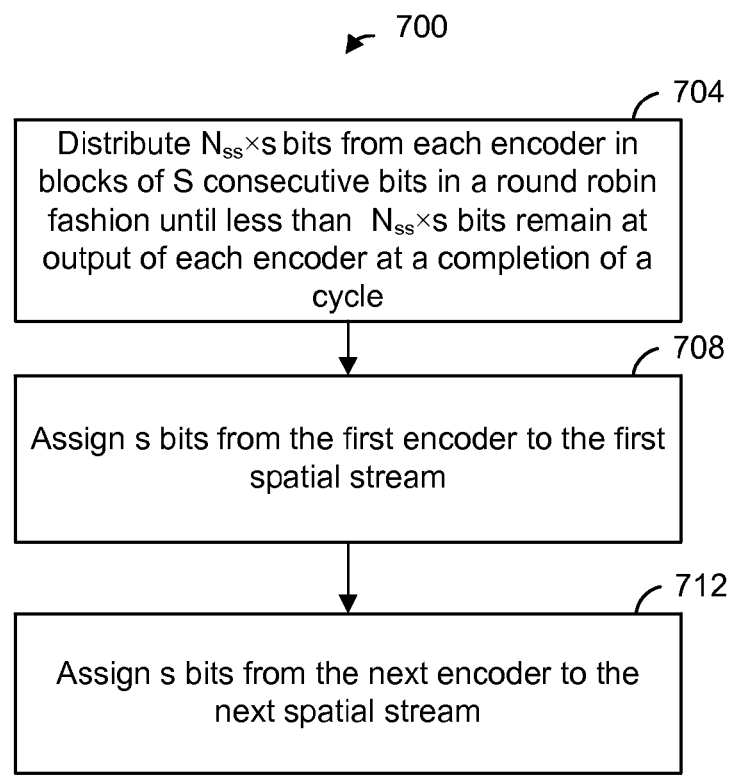
FIG. 7 is a diagram illustrating another parsing technique using a set of parsing rules which accommodate uneven distribution of bits from encoders to spatial streams, according to another embodiment.

FIG. 7 illustrates another parsing technique 700 using a set of parsing rules which accommodate uneven distribution of bits from the operating encoders to the $N_{SS}$ spatial streams, according to another embodiment. Similar to the parsing technique 600 of FIG. 6, $N_{SS} \times s$ bits from each operating encoder are assigned in consecutive blocks of s bits in a round robin fashion to $N_{SS}$ spatial streams at block 704, as discussed above with reference to Equation 1, less than $N_{SS} \times s$ bits remain at the encoder outputs. In an embodiment, M×s residue bits remain at the output of each of the operating encoders, where M is an integer and M<$N_{SS}$. At block 708, the first s bits from the first encoder are assigned to the first spatial stream. At block 712, the first s bits from the second-encoder are assigned to the corresponding next spatial stream. In an embodiment, block 712 is repeated for the subsequent (the third, the fourth and so on) encoders and subsequent spatial streams until all bits from all operating encoders have been distributed in this manner among the $N_{SS}$ spatial streams.

Figure 8:
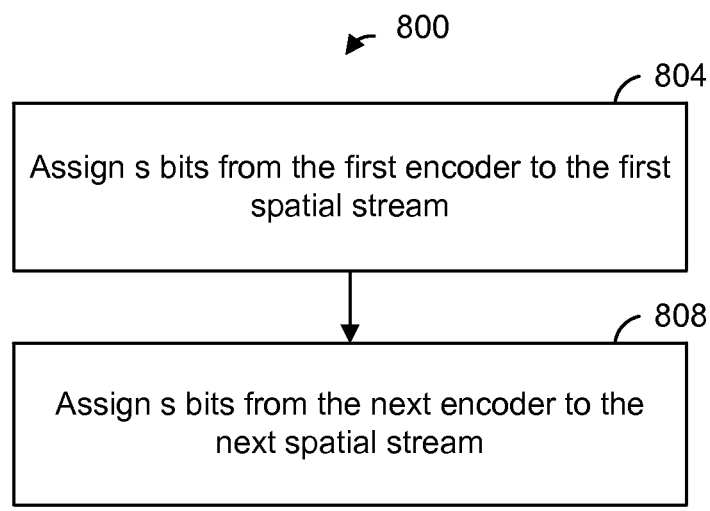
FIG. 8 is a diagram illustrating yet another parsing technique using a set of parsing rules which accommodate uneven distribution of bits from encoders to spatial streams, according to yet another embodiment.

FIG. 8 illustrates yet another example parsing technique 800 using a set of parsing rules which accommodates uneven bit distribution from the operating encoders to the $N_{SS}$ spatial streams, according to yet another embodiment. Parsing technique 800 is similar to the parsing technique 700 of FIG. 7, except that the act of assigning $N_{SS} \times s$ bits to the spatial streams until less than $N_{SS} \times s$ residue bits remain at the output of each encoder is omitted from the parsing technique 800. Rather, according to the parsing technique 800, at block 804, s bits from the first encoder are assigned to the first spatial stream. At block 808, S bits from the second encoder are assigned to the corresponding next spatial stream. In an embodiment, block 808 is repeated for the subsequent encoders (the third, the fourth and so on) and subsequent spatial streams until all bits have been distributed in this manner among the $N_{SS}$ spatial streams.

Referring to FIGS. 2 and 3, the parsing technique 600, the parsing technique 700, or the parsing technique 800 is implemented in the PHY processing unit 200 or the PHY processing unit 300 (e.g., in the stream parser 216, or the stream parser 316), in various embodiments and/or scenarios. Referring to FIG. 1, in some embodiments, the parsing technique 600, the parsing technique 700, and/or the parsing technique 800 is implemented in the network interface 16 and/or the network interface 27. For example, in some embodiments, the parsing technique 600, the parsing technique 700, and/or the parsing technique 800 is implemented in the PHY processing unit 20 and/or the PHY processing unit 29. In some embodiments, the parsing technique 600, the parsing technique 700, or the parsing technique 800 is implemented partially in the MAC processing unit 18 and/or the MAC processing unit 28, and partially in the PHY processing unit 20 and/or the PHY processing unit 29, respectively.

In some embodiments or scenarios, the parsing technique 600, the parsing technique 700, or the parsing technique 800 is utilized for stream parsing only in cases in which coded bits in an OFDM symbol cannot be equally distributed from each of the operating encoders among the spatial streams (e.g., for system configurations for which Equation 3 is not satisfied). For example in some embodiments, a first set of parsing rules, such as the parsing rules described above in reference to Equation 1 is utilized for all allowed MCS/bandwidth/number of spatial streams combinations for 20 MHz, 40 MHz, 80 MHz and 160 MHz channels, and an altered set of parsing rules (e.g., in accordance with the parsing technique 600, the parsing technique 700, or the parsing technique 800) is utilized only for the 160 MHz channel cases for which the parsing constraint that ensures that equal bit distribution from each operating encoder to the spatial streams can be achieved. For instance, in one embodiment, the parsing technique 600, the parsing technique 700, or the parsing technique 800 is used only in the cases of a 160 MHz channel using one of the four system configurations listed in the table of FIG. 5.

Alternatively, in another embodiment, a common set of parsing rules is utilized for all allowed system configurations. In one such embodiment, the parsing technique 600, the parsing technique 700, or the parsing technique 800 is utilized even in cases in which spatial stream parsing described above with reference to Equation 1 would result in equal parsing of coded bits from each operating encoder to the $N_{SS}$ spatial streams, that is, even in situations in which the constraint of Equation 3 is satisfied. In this case, in some embodiments utilizing the parsing technique 600 or the parsing technique 700, only the block 604 or block 704, respectively, needs to be implemented in situations in which the constraint of Equation 3 is satisfied because in these situations, the number of coded bits at the output of each operating encoder is an integer multiple of $N_{SS} \times s$. It should also be noted that, in general, because $N_{CBPS}/N_{SS}$ is an integer, the parsing technique 600, the parsing technique 700, and the parsing technique 800 results in the coded bits being equally distributed among the $N_{SS}$ spatial streams in all allowed system configurations, but the bit contribution from each encoder to each spatial stream is not equal in situations in which the constraint of Equation 3 is not satisfied.

As an alternative to allowing uneven bit distribution form each operating encoder to the $N_{SS}$ spatial streams, in one embodiment, the system configurations that do not satisfy Equation 3 are excluded from the set of allowed system configurations. Accordingly, in this embodiment, the MCS exclusion rule expressed by Equation 2 is modified such that Equation 3 is also included in the MCS exclusion rules. That is, in this embodiment, Equation 3 needs to be satisfied, in addition to Equation 2, in order for an MCS to be allowed for the particular system configuration. Accordingly, in one such embodiment, the four MCS/number of spatial streams combinations listed in the table of FIG. 5 are not allowed to be utilized for transmission.

As discussed above, a PHY processing unit, e.g., the PHY processing unit 200 of FIG. 2, or the PHY processing unit 300 of FIG. 3, is utilized to encode and transmit data units, according to an embodiment. In some embodiments, the PHY processing unit is also configured for receiving and decoding data units. The number of decoders utilized to decode a data stream generally corresponds to the number of encoders used to encode the data stream. Therefore, an AP (such as the AP 14) and/or a client station (such as the client station 25-1) generally includes an equal number of encoders and decoders. In some embodiments, however, the number of encoders is different than the number of decoders. In an embodiment, the number of decoders operating simultaneously increments at multiples of a certain data rate, e.g., the number of decoders increments for each 600 Mbps in the data rate. In other words, one decoder is utilized for data rates up to 600 Mbps, two decoders are utilized for data rates between 600 Mbps and 1200 Mbps, as an example. In some embodiments, a received data unit is parsed from a number of spatial streams to the appropriate number of decoders using parsing rules that are generally based on a reverse of the parsing rules used to generate the data unit, such as, for example, a reverse of parsing rules associated with the parsing technique 600 of FIG. 6, the parsing technique 700 of FIG. 7, the parsing technique 800 of FIG. 8, or another set of suitable parsing rules.

More specifically, in an embodiment, because a client station (e.g., the client station 25-1 of FIG. 1) generally has the knowledge of MCS exclusion rules and parsing rules used for transmission, the client station is able to properly recover the transmitted information bits upon reception of a data unit. To this end, in an embodiment, the particular MCS utilized for transmission, the channel bandwidth, and/or the number of spatial streams in a data unit are communicated to the client station by the AP, for example, in one or more signal fields of a preamble of the data unit. In an embodiment in which different parsing rules are specified for different system configurations, the client station is then able to determine the particular system configuration used to transmit a data unit and apply the appropriate set of parsing rules needed to properly decode the data.

Figure 9:
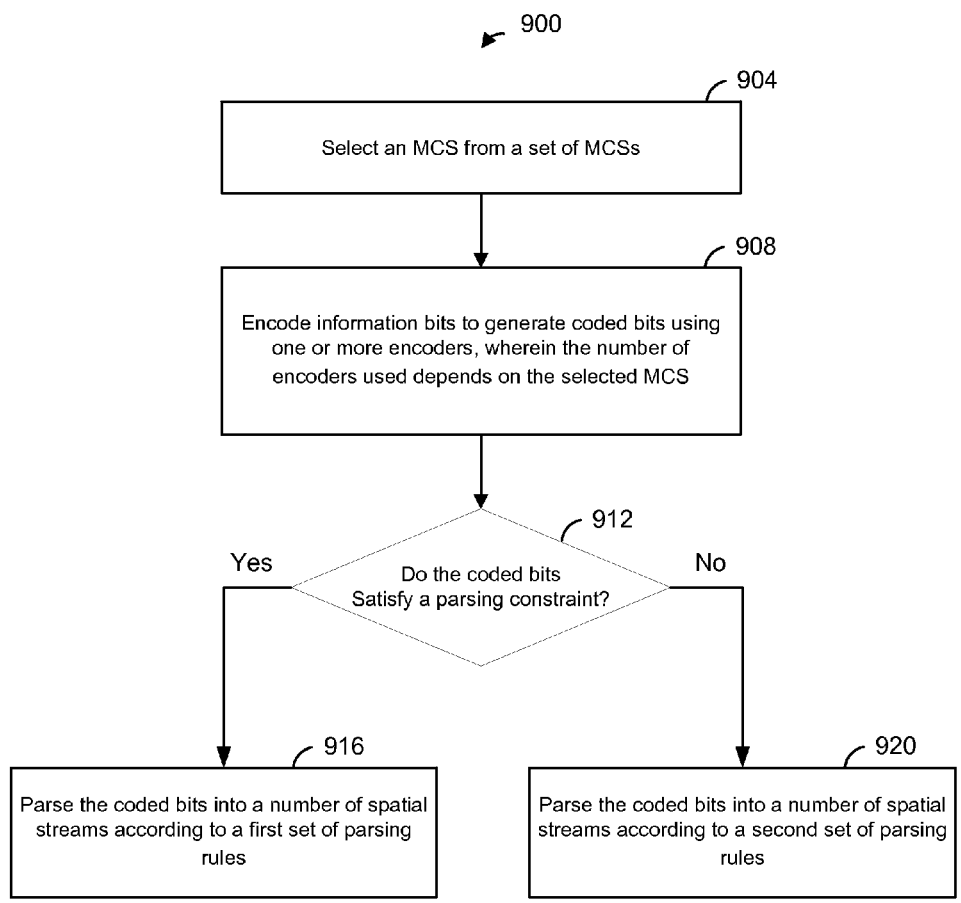
FIG. 9 is a flow diagram of an example method for parsing bits in a data unit into a number of spatial streams, according to an embodiment.

FIG. 9 is a flow diagram of an example method 900 for parsing bits in a data unit into a number of spatial streams, according to an embodiment. The method 900 is implemented by the network interface 16 (e.g., the PHY processing unit 20 of FIG. 1), in an embodiment. The method 900 is implemented by the network interface 27 (e.g., the PHY processing unit 29 of FIG. 1), in another embodiment. In other embodiments, the method 900 is implemented by other suitable network interfaces.

At block 904, an MCS is selected from a set of MCSs. In an embodiment, an MCS is selected from the MCS table provided in FIG. 5. In other embodiments, other suitable MCS tables are utilized. In one embodiment, an MCS is selected for a particular channel only if one or more MCS exclusion rules are satisfied for the system configuration corresponding to the particular channel bandwidth/number of spatial streams combination being utilized. For example, an MCS is selected only if Equation 2 is satisfied for the system configuration corresponding to the particular channel bandwidth/number of spatial streams combination being utilized, according to an embodiment.

At block 908, data bits in the data unit are encoded using the number of encoders needed to encode the data, wherein the number of encoders depends on the MCS selected at block 908. More specifically, the number of needed encoders is determined by the data rate associated with the particular MCS/channel bandwidth/number of spatial streams combination being utilized. For example, in one embodiment, the number of needed encoders corresponding to a particular data rate is determined based on a 600 Mbps encoder increment step.

At block 912, it is determined whether the coded bits satisfy a certain parsing constraint. For example, in one embodiment, it is determined whether Equation 3 is satisfied for the particular MCS/channel bandwidth/number of spatial streams combination being utilized. That is, in this embodiment, it is determined at block 912 whether the number of coded bits at the output of each of the operating encoders is an integer multiple of the number of spatial streams.

At block 916, the coded bits are parsed into the number of spatial streams being utilized for transmission according to a first set of parsing rules. That is, the first set of parsing rules is used if it is determined at block 912 that the parsing constraint is satisfied. In an embodiment, the first set of parsing rules corresponds to the parsing rules described above with reference to Equation 1. In another embodiment, the first set of parsing rules corresponds to one or more other suitable parsing rules.

At block 920, the coded bits are parsed into the number of streams being utilized for transmission according to a second set of parsing rules. That is, the second set of parsing rules is used if it is determined at block 912 that the parsing constraint is not satisfied. In an embodiment, the second set of parsing rules is specified according to the parsing technique 600 of FIG. 6. In another embodiment, the second set of parsing rules is specified according to the parsing technique 700 of FIG. 7. In yet another embodiment, the second set of parsing rules is specified according to the parsing technique 800 of FIG. 8. In another embodiment, the second set of parsing rules corresponds to one or more other suitable parsing rules.

In some embodiments, block 912 is omitted and a single set of one or more parsing rules is utilized for all allowed system configurations.

Figure 10:
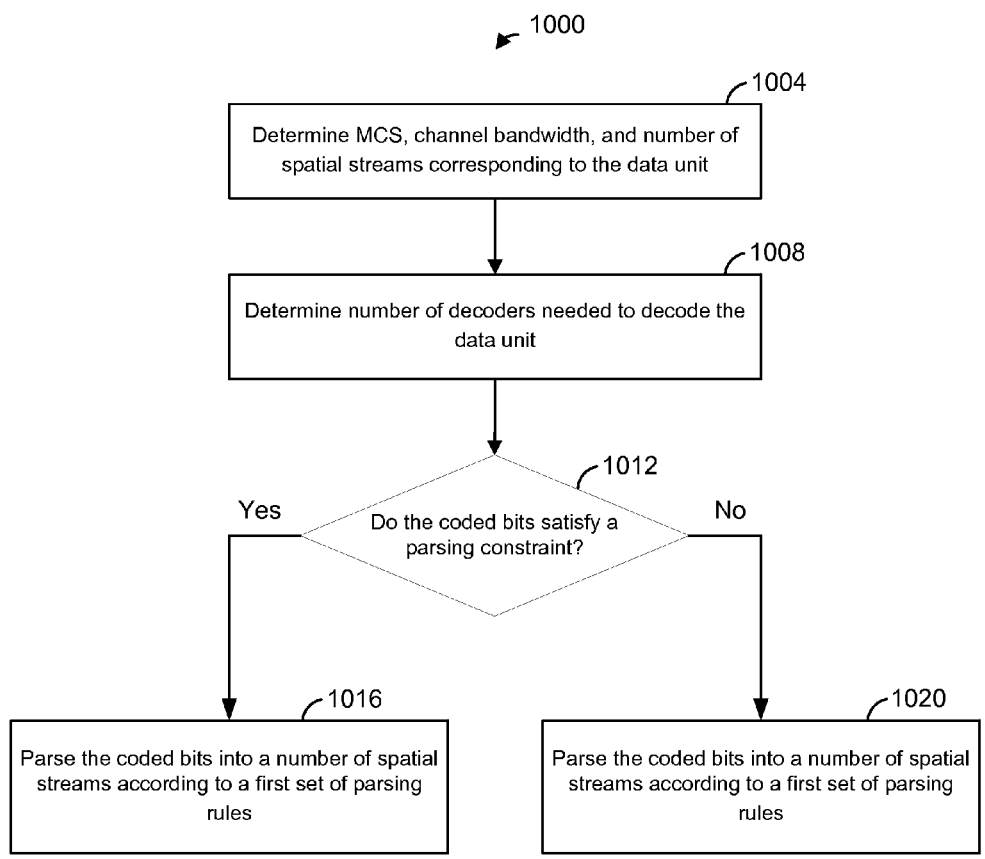
FIG. 10 is a flow diagram of an example method for decoding a data unit, according to an embodiment.

FIG. 10 is a flow diagram of an example method 1000 for decoding a data unit, according to an embodiment. In an embodiment, the data unit is received via a wireless network such as the network 10 (FIG. 1) or another suitable network. The method 1000 is implemented by the network interface 16 (e.g., the PHY processing unit 20 of FIG. 1), in an embodiment. The method 900 is implemented by the network interface 27 (e.g., the PHY processing unit 29 of FIG. 1), in another embodiment. In other embodiments, the method 900 is implemented by other suitable network interfaces.

In an embodiment, the received data unit includes a preamble generally used to communicate certain characteristics of the data unit to a receiver. For example, in one embodiment, a preamble of a data unit indicates to a receiver the particular MCS that was used to modulate the data, the channel bandwidth, and the number of spatial streams, and this information is used by the receiver to unambiguously decode the data. In other embodiments, the receiver determines the particular MCS that was used to modulate the data, the channel bandwidth, and/or the number of spatial streams using other suitable techniques.

At block 1004, the MCS, channel bandwidth and the number of spatial streams corresponding to the data unit is determined. In an embodiment, the MCS, the channel bandwidth and the number of spatial streams are determined by analyzing one or more fields in a preamble portion of the data unit. In other embodiments, the MCS that was used to modulate the data, the channel bandwidth, and/or the number of spatial streams are determined using other suitable techniques.

At block 1008 the number of decoders needed to decode the data unit is determined. In an embodiment, the number of decoders depends on the MCS that was used to modulate and encode the data unit (i.e., the MCS determined block 1008). More specifically, the number of needed decoders is determined by the data rate associated with the particular MCS/channel bandwidth/number of spatial streams combination that was used to generate the data unit. In one embodiment, the number of decoders corresponding to a particular data rate is determined based on a 600 Mbps decoder increment step. In other embodiments, the number of decoder corresponding to a particular data rate is determined based on another suitable increment step.

At block 1012, it is determined whether the coded bits satisfy a certain parsing constraint. For example, in one embodiment, it is determined whether Equation 3 is satisfied for the MCS/channel bandwidth/number of spatial streams combination corresponding to the data unit. That is, in this embodiment, it is determined at block 1012 whether the number of coded bits to be input to each of the decoders is an integer multiple of the number of spatial streams.

At block 1016, the coded bits from the spatial streams (the number of which is determined at block 1008) are parsed into the number of decoders according to a first set of parsing rules. That is, the first set of parsing rules is used if it is determined at block 1012 that the parsing constraint is satisfied. In an embodiment, the first set of parsing rules generally corresponds to a reverse of the parsing rules described above with reference to Equation 1. In another embodiment, the first set of parsing rules corresponds to one or more other parsing rules generally based on a reverse of parsing rules used to parse the data into the number of spatial streams at the transmitter.

At block 1020, the coded bits from the spatial streams (the number of which is determined at block 1008) are parsed into the number of decoders according to a second set of parsing rules. That is, the second set of parsing rules is used if it is determined at block 1012 that the parsing constraint is not satisfied. In an embodiment, the second set of parsing rules is specified based on a reverse of the rules associated with the parsing technique 600 of FIG. 6. In another embodiment, the second set of parsing rules is specified based on a reverse of the rules associated with the parsing technique 700 of FIG. 7. In yet another embodiment, the second set of parsing rules is specified based on a reverse of the rules associated with the parsing technique 800 of FIG. 8. In another embodiment, the second set corresponds to one or more other suitable parsing rules generally based on a reverse of parsing rules used to parse the data into the number of spatial streams at the transmitter.

In some embodiments, block 1012 is omitted and a single set of one or more parsing rules is utilized for all allowed system configurations.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed:

1. A method for parsing data in a data unit into a number of spatial streams, the method comprising:
    selecting a modulation and coding scheme (MCS) from a plurality of MCSs;
    encoding information bits to generate coded bits using a plurality of encoders, wherein
        a number of encoders in the plurality of encoders corresponds to the selected MCS,
        each encoder generates a number of consecutive blocks of s bits,
        s is an integer the value of which depends on a constellation size corresponding to the selected MCS, and
        a parsing constraint corresponds to the number of consecutive blocks of s bits being an integer multiple of the number of encoders;
    parsing the coded bits into the number of spatial streams according to a first set of parsing rules if the coded bits satisfy the parsing constraint; and
    parsing the coded bits into the number of spatial streams according to a second set of parsing rules if the coded bits do not satisfy the parsing constraint, wherein parsing the coded bits according to the second set of parsing rules comprises
        assigning consecutive blocks of s bits from each encoder in a round robin fashion to the spatial streams, wherein a consecutive block of s bits from one encoder is assigned to each of the spatial streams in a cycle until M×s residue bits remain at the output of each encoder at a completion of a cycle, wherein M is an integer less than the number of spatial streams,
        assigning the M×s residue bits from a first encoder to a first set of M spatial streams, wherein a consecutive block of s bits from the first encoder is assigned to each spatial stream in the first set of M spatial streams, and
        assigning the M×s residue bits from a second encoder to a second set of M spatial streams, wherein a consecutive block of s bits from the second encoder is assigned to each spatial stream in the second set of M spatial streams.

2. A method according to claim 1, wherein parsing the coded bits according to the first set of parsing rules comprises assigning consecutive blocks of s bits from each encoder in a round robin fashion to the spatial streams, wherein a consecutive block of s bits is assigned to each of the spatial streams from one of the encoders in a cycle.

3. A method according to claim 2, wherein parsing the coded bits according to the first set of parsing rules further comprises assigning an equal number of coded bits from each encoder to each of the spatial streams.

4. A method for parsing data in a data unit into a number of spatial streams, the method comprising:
    selecting a modulation and coding scheme (MCS) from a plurality of MCSs;
    encoding information bits to generate coded bits using a plurality of encoders, wherein
        a number of encoders in the plurality of encoders corresponds to the selected MCS, and
        each encoder generates a number of consecutive blocks of s bits,
        s is an integer the value of which depends on a constellation size corresponding to the selected MCS, and
        a parsing constraint corresponds to the number of consecutive blocks of s bits being an integer multiple of the number of encoders;
    parsing the coded bits into the number of spatial streams according to a first set of parsing rules if the coded bits satisfy the parsing constraint; and
    parsing the coded bits into the number of spatial streams according to a second set of parsing rules if the coded bits do not satisfy the parsing constraint, wherein parsing the coded bits according to the second set of parsing rules comprises:
        assigning consecutive blocks of s bits from each encoder in a round robin fashion to the spatial streams, wherein a consecutive block of s bits from one encoder is assigned to each of the spatial streams in a cycle until M×s residue bits remain at the output of each encoder at a completion of a cycle, wherein M is an integer less than the number of spatial streams,
        assigning a first consecutive block of s residue bits from a first encoder to a first spatial stream,
        assigning a first consecutive block of s residue bits from a second encoder to a second spatial stream, and
        if more residues bits remain at the outputs of the number of encoders:
            assigning a second consecutive block of s residue bits from the first encoder to a next available spatial stream, and
            assigning a second consecutive block of s residue bits from the second encoder to another next available spatial stream.

5. A method for parsing data in a data unit into a number of spatial streams, the method comprising:
    selecting a modulation and coding scheme (MCS) from a plurality of MCSs;
    encoding information bits to generate coded bits using a plurality of encoders, wherein
        a number of encoders in the plurality of encoders corresponds to the selected MCS,
        each encoder generates a number of consecutive blocks of s bits,
        s is an integer the value of which depends on a constellation size corresponding to the selected MCS, and
        a parsing constraint corresponds to the number of consecutive blocks of s bits being an integer multiple of the number of encoders;

parsing the coded bits into the number of spatial streams according to a first set of parsing rules if the coded bits satisfy the parsing constraint; and parsing the coded bits into the number of spatial streams according to a second set of parsing rules if the coded bits do not satisfy the parsing constraint, wherein parsing the coded bits according to the second set of parsing rules comprises:

assigning a first consecutive block of s residue bits from a first encoder to a first spatial stream, assigning a first consecutive block of s residue bits from a second encoder to a second spatial stream, and if more residues bits remain at the outputs of the number of encoders:

assigning a second consecutive block of s residue bits from the first encoder to a next available spatial stream, and assigning a second consecutive block of s residue bits from the second encoder to another next available spatial stream.

6. An apparatus for transmitting data in a wireless network, the apparatus comprising:

a network interface configured to
select a modulation and coding scheme (MCS) from a plurality of MCSs, and
wherein the network interface includes:
a plurality of encoders, wherein the network interface is configured to use the plurality of encoders to encode information bits to generate coded bits, wherein
a number of encoders in the plurality of encoders corresponds to the selected MCS,
each of the number of encoders encodes a number consecutive block of s bits,
s is an integer the value of which depends on a constellation size corresponding to the selected MCS, and
a parsing constraint corresponds to the number of consecutive block of s bits being an integer multiple of the number of encoders; and
a spatial stream parser configured to:
(i) parse the coded bits into a number of spatial streams according to a first set of parsing rules if the coded bits satisfy the parsing constraint, and
(ii) parse the coded bits into the number of spatial streams according to a second set of parsing rules if the coded bits do not satisfy the parsing constraint, including
assigning consecutive blocks of s bits from each of the number of encoders in a round robin fashion to the spatial streams, wherein a consecutive block of s bits from one encoder is assigned to each of the spatial streams in a cycle until M×s residue bits remain at the output of each of the number of encoders at a completion of a cycle, wherein M is an integer less than the number of spatial streams,
assigning the M×s residue bits from a first encoder to a first set of M spatial streams, wherein a consecutive block of s bits from the first encoder is assigned to each spatial stream in the first set of M spatial stream, and
assigning the M×s residue bits from a second encoder to a second set of M spatial streams, wherein a consecutive block of s bits from the second encoder is assigned to each spatial stream in the second set of M spatial stream.

7. An apparatus according to claim 6, wherein the spatial stream parser is configured to parse the coded bits according to the first set of parsing rules by assigning consecutive block of s bits from each of the number of encoders in a round robin fashion to the spatial streams, wherein a consecutive block of s bits is assigned to each of the spatial streams from one of the number of encoders in a cycle.

8. An apparatus according to claim 7, wherein the spatial stream parser is further configured to assign an equal number of coded bits from each of the number of encoders to each of the spatial streams.

9. An apparatus for transmitting data in a wireless network, the apparatus comprising:

a network interface configured to
select a modulation and coding scheme (MCS) from a plurality of MCSs, and
wherein the network interface includes:
a plurality of encoders, wherein the network interface is configured to use a plurality of encoders to encode information bits to generate coded bits, wherein a number of encoders in the plurality of encoders corresponds to the selected MCS, wherein
the number of encoders in the plurality of encoders corresponds to the selected MCS,
each of the number of encoders encodes a number of consecutive block of s bits,
s is an integer the value of which depends on a constellation size corresponding to the selected MCS, and
a parsing constraint corresponds to the number of consecutive block of s bits being an integer multiple of the number of encoders;
a spatial stream parser configured to:
(i) parse the coded bits into a number of spatial streams according to a first set of parsing rules if the coded bits satisfy the parsing constraint, and
(ii) parse the coded bits into the number of spatial streams according to a second set of parsing rules if the coded bits do not satisfy the parsing constraint, including
assigning consecutive blocks of s bits from each of the number of encoders in a round robin fashion to the spatial streams, wherein a consecutive block of s bits from one encoder is assigned to each of the spatial streams in a cycle until M×s residue bits remain at the output of each of the number of encoders at a completion of a cycle, wherein M is an integer less than the number of spatial streams,
assigning a first consecutive block of s residue bits from a first encoder to a first spatial stream,
assigning a first consecutive block of s residue bits from a second encoder to a second spatial stream, and
if more residues bits remain at the outputs of the number of encoders
assigning a second consecutive block of s residue bits from the first encoder to a next available spatial stream, and
assigning a second consecutive block of s residue bits from the second encoder to another next available spatial stream.

10. An apparatus for transmitting data in a wireless network, the apparatus comprising:

a network interface configured to
select a modulation and coding scheme (MCS) from a plurality of MCSs, and wherein the network interface includes:
a plurality of encoders, wherein the network interface is configured to use the plurality of encoders to encode information bits to generate coded bits, wherein a number of encoders in the plurality of encoders corresponds to the selected MCS, wherein
the number of encoders in the plurality of encoders corresponds to the selected MCS,
each of the number of encoders encodes a number of consecutive block of s bits,
s is an integer the value of which depends on a constellation size corresponding to the selected MCS, and
a parsing constraint corresponds to the number of consecutive block of s bits being an integer multiple of the number of encoders;
a spatial stream parser configured to:
(i) parse the coded bits into a number of spatial streams according to a first set of parsing rules if the coded bits satisfy the parsing constraint, and
(ii) parse the coded bits into the number of spatial streams according to a second set of parsing rules if the coded bits do not satisfy the parsing constraint, including
assigning a first consecutive block of s residue bits from a first encoder to a first spatial stream,
assigning a first consecutive block of s residue bits from a second encoder to a second spatial stream, and
if more residues bits remain at the outputs of the number of encoders:
assigning a second consecutive block of s residue bits from the first encoder to a next available spatial stream, and
assigning a second consecutive block of s residue bits from the second encoder to another next available spatial stream.

* * * * *